July 1, 1930.  O. J. DANSEREAU ET AL  1,768,830

VALVE FOR COMPRESSORS AND METHOD OF MAKING THE SAME

Filed Feb. 11, 1928

Inventors:
Omer J. Dansereau.
Thomas Officer.
By Louis A. Maxam.
Attorney.

Patented July 1, 1930

1,768,830

UNITED STATES PATENT OFFICE

OMER J. DANSEREAU AND THOMAS OFFICER, OF CLAREMONT, NEW HAMPSHIRE, ASSIGNORS TO SULLIVAN MACHINERY COMPANY, A CORPORATION OF MASSACHUSETTS

VALVE FOR COMPRESSORS AND METHOD OF MAKING THE SAME

Application filed February 11, 1928. Serial No. 253,706.

Our invention relates to an improvement in methods of making valves for compressors or similar articles and to an improved article so manufactured.

In the modern high speed compressor, opening and closing of inlet and discharge valves has increased in frequency to a great extent in recent years; and the employment of light valves stamped from sheet metal has developed to facilitate the rapid opening and closing movements. Even with such valves the great number of times the valves engage their seats per minute has occasioned frequent breakage; and the cure for this was for some time unknown. We have discovered that by the elimination of minute cracks and fissures left as a result of the stamping operations, the breakage of valves is greatly reduced. Though minute and almost invisible when the valves as formerly constructed were put in use, the tiny cracks or fissures developed during the use of the valve in a compressor; and in time, the impact and strain to which the valve elements were subjected frequently developed these flaws into breaks or other serious faults or failures.

From one aspect, our invention consists in the provision of a method of manufacture of valves or similar metallic articles whereby the perfectly sized completed valves are free from all peripheral fissures or cracks which might develop under the stress of use into breakage of the valve. According to a preferred method the blanks from which the valves are to be formed are punched somewhat oversize, and then ground peripherally to size, and finally beveled at sharp edges. From another aspect, the invention comprises an improved valve element per se having the precise dimensions requisite for its best employment; but having all of its peripheral edges ground to such an extent that there are no cracks or fissures remaining, and preferably having sharp peripheral edges eliminated.

One object of our invention is to provide an improved method of forming valve or like elements from sheet stock. A further object of our invention is to provide an improved method of manufacturing valves of the plate or disc type which shall be free from cracks or other fissures tending to rapid deterioration of the valve. A still further object of our invention is to provide an improved valve element per se. Other objects and advantages will later appear.

In the accompanying drawings, in which for purposes of illustration a series of steps in a preferred method of manufacture according to our invention are shown, together with a finished valve, Fig. 1 is a plan view and an edge view of a valve blank at the completion of the punching or stamping process.

Figure 5:
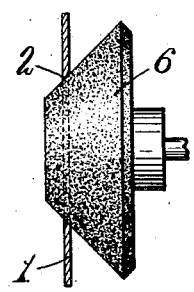

Fig. 5 a final grinding operation.

Figure 6:
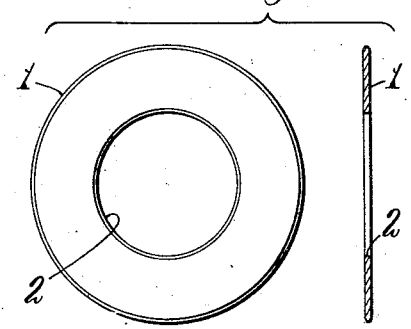

Fig. 6 is a plan and diametric section of a finished valve element, and

Figure 7:
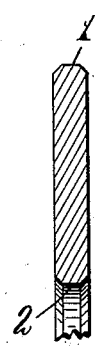

Fig. 7 an enlarged sectional view on a diametric line through one side of a valve element.

In a preferred method of manufacture, an oversize blank 1 having a central opening 2 and having a small excess of stock both internally and externally, as indicated by the dotted lines, is formed by punching or stamping from suitable steel sheet stock, as for example Swedish spring steel or stainless steel. This step needs no specific illustration, being effected by successive or simultaneous punching from the sheet and oversize circular blank and punching therefrom an undersize central circular piece. In the use of stainless steel, in the event that the blanks are punched soft, heat treatment to harden them is essential; and surface grinding to smooth the plane surfaces is effected on a surface grinder.

Figure 1:
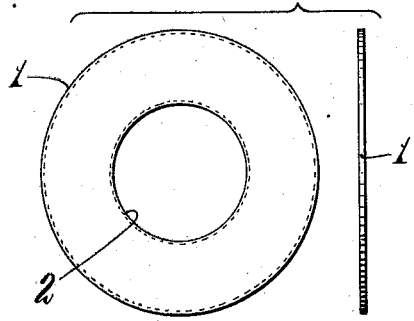
Figure 2:
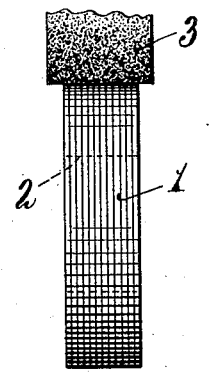
Fig. 2 shows a grinding operation thereon.
Figure 3:
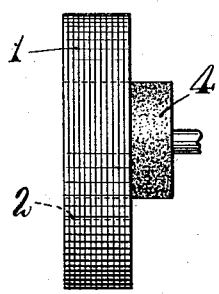
Fig. 3 shows a further grinding operation thereon.
Figure 4:
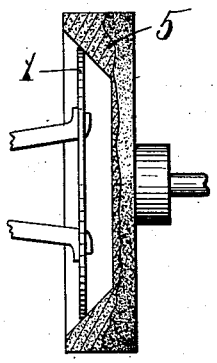
Fig. 4 shows a still further grinding operation thereon.

The blanks 1, however formed, are ground both externally and internally to reduce their overall diameter to the desired limit and to enlarge the central opening 2 to the necessary size. Preferably a series of blanks are first mounted on an arbor, not shown, and externally ground by a wheel 3 as shown in Fig. 2, the blanks rotating as grinding progresses. When the external grinding is completed the annuli are of the proper external diameter, and the grinding operation removes all of the cracked or fissured metal. The blanks are next mounted in a suitable fixture and ground internally by a wheel 4, the fixture support and the grinding making the opening 2 concentric with the periphery; and all the fissured or cracked metal at the internal periphery is ground off.

At the completion of these two steps, which might, with suitable modification in fixtures and tools, be performed in reversed sequence, the blanks are perfectly sized and free from incipient cracks, but still have sharp edges. As thus formed they are superior to the usual valves, but it is preferable to smooth off the sharp edges. These may be removed by holding first one side and then the other of a finished blank in contact with an internally conical wheel 5, producing external beveled edges, and thereafter (or in reverse order if desired) beveling the inner edges as by holding the edges successively in contact with an externally conical wheel 6.

A finished valve element is shown in Figs. 6 and 7, and it will be noted that the same is perfectly sized, and has no right angled edges, and is perfectly smooth internally and externally.

From the foregoing description it will be apparent that we have provided not only an improved and simplified process of making an improved valve element, but also an improved valve element per se.

It will be understood that the method and article above described are illustrative only of our invention and that modifications both in the method and in the article may be made within the scope of our invention as set forth in the appended claims.

What we claim as new and desire to secure by Letters Patent is:

1. The process of manufacturing valves or the like from sheet metal which comprises punching blanks oversize and then removing metal forming edge portions of the blanks to free such edges of the article from flaws or incipient fissures.

2. The process of manufacturing valves or the like from sheet metal which comprises punching the blanks oversize and then grinding off edge portions to free such edges of the article from flaws or incipient fissures.

3. The process of manufacturing valves or the like from steel which comprises forming the blanks oversize from sheets of tempered steel by suitable dies and then removing metal forming edge portions of the blanks to substantially free such edges of the article from flaws or incipient fissures.

4. The process of manufacturing valves or the like from steel which comprises punching the blanks oversize from sheets of spring steel by suitable dies and then grinding off edge portions to substantially free such edges of the article from flaws or incipient fissures.

5. The process of manufacturing valves or the like from spring steel which comprises punching perforated blanks oversize from sheets of spring steel by suitable dies, then removing metal forming inner and outer edge portions of the blanks to free such inner and outer edges of the article from flaws or incipient fissures, and beveling inner and outer edges.

6. An annular valve element having inner and outer edges comprising round coaxial cylindrical portions and ground beveled shoulders.

In testimony whereof we affix our signatures.

OMER J. DANSEREAU.
THOMAS OFFICER.